US008832483B1

(12) United States Patent
Chudgar et al.

(10) Patent No.: US 8,832,483 B1
(45) Date of Patent: Sep. 9, 2014

(54) SYSTEM-ON-CHIP WITH POWER-SAVE MODE PROCESSOR

(75) Inventors: Keyur Chudgar, San Jose, CA (US); Vinay Ravuri, Cupertino, CA (US); Prodyut Hazarika, Mountain View, CA (US)

(73) Assignee: Applied Micro Cicuits Corporation, Sunnyvale, CA (US)

( * ) Notice: Subject to any disclaimer, the term of this patent is extended or adjusted under 35 U.S.C. 154(b) by 674 days.

(21) Appl. No.: 13/014,616

(22) Filed: Jan. 26, 2011

Related U.S. Application Data

(63) Continuation-in-part of application No. 12/900,828, filed on Oct. 8, 2010, which is a continuation-in-part of application No. 12/687,817, filed on Jan. 14, 2010, which is a continuation-in-part of application No. 12/639,064, filed on Dec. 16, 2009.

(51) Int. Cl.
*G06F 1/32* (2006.01)

(52) U.S. Cl.
USPC ............................ 713/324; 713/320; 713/322

(58) Field of Classification Search
None
See application file for complete search history.

(56) References Cited

U.S. PATENT DOCUMENTS

| 6,694,360 | B1 * | 2/2004 | Duguay et al. ............... 709/220 |
| 7,222,245 | B2 | 5/2007 | Singh |
| 7,245,725 | B1 * | 7/2007 | Beard ............................ 380/270 |
| 2005/0007628 | A1 * | 1/2005 | Yamano et al. ............... 358/1.15 |
| 2008/0288748 | A1 * | 11/2008 | Sutardja et al. ................. 712/20 |
| 2009/0089470 | A1 | 4/2009 | Ven |
| 2009/0163226 | A1 | 6/2009 | Karkaria et al. |
| 2010/0083260 | A1 | 4/2010 | Wang et al. |
| 2010/0205467 | A1 | 8/2010 | Park |

* cited by examiner

*Primary Examiner* — Dennis M Butler
(74) *Attorney, Agent, or Firm* — Amin, Turocy & Watson, LLP

(57) ABSTRACT

A system-on-chip (SoC) is provided with a low power processor to manage power-save mode operations. The SoC has a high-speed group with a high-speed processor, a standby agent, and a governor. In response to inactivity, the governor establishes a power-save mode and deactivates the high-speed group, but not the standby agent. The standby agent monitors SoC input/output (IO) interfaces, and determines the speed requirements associated with a received communication. In response to determining that the communication does not prompt a high-speed SoC operation, the standby agent responds to the communication. Likewise, the standby agent monitors SoC internal events such as housekeeping and timer activity, and the standby performs the tasks if it is determined that the tasks do not require a high-speed SoC operation. Alternatively, if monitored communication or internal event prompts a high-speed SoC operation, the governor activates a member of the high-speed group.

20 Claims, 3 Drawing Sheets

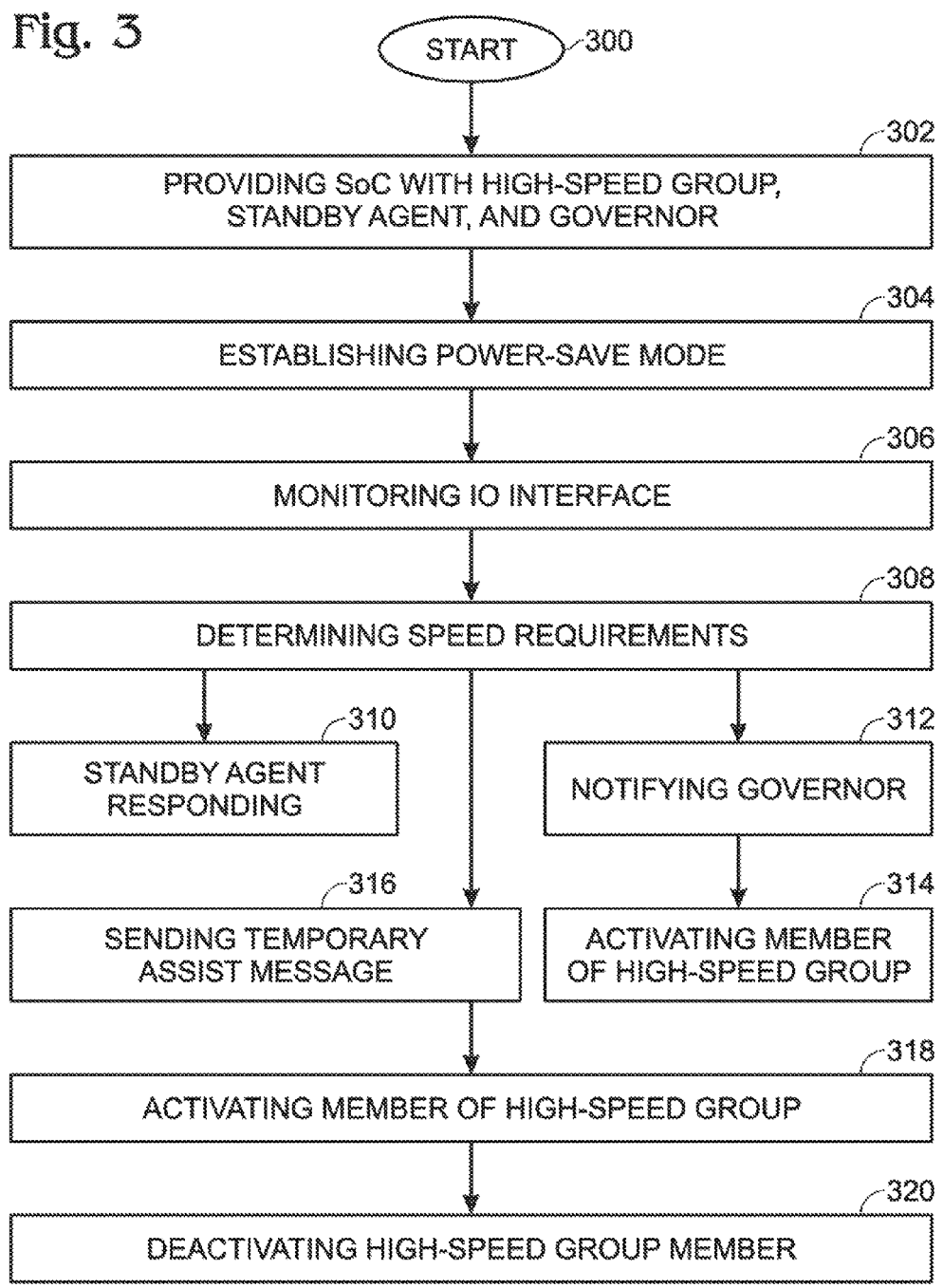

SYSTEM-ON-CHIP WITH POWER-SAVE MODE PROCESSOR

RELATED APPLICATIONS

This application is a Continuation-in-Part of a pending application entitled, SYSTEM-ON-CHIP WITH MANAGEMENT MODULE FOR CONTROLLING PROCESSOR CORE INTERNAL VOLTAGES, invented by Waseem Kraipak et al., Ser. No. 12/900,828, filed Oct. 8, 2010;

which is a Continuation-in-Part of a pending application entitled, SYSTEM-ON-CHIP WITH THERMAL MANAGEMENT CORE, invented by Waseem Kraipak et al., Ser. No. 12/687,817, filed Jan. 14, 2010;

which is a Continuation-in-Part of a pending application entitled, SYSTEM-ON-CHIP WITH FEEDBACK LOOP FOR PROCESSOR FREQUENCY CONTROL, invented by Waseem Kraipak et al., Ser. No. 12/639,064, filed Dec. 16, 2009. Both these applications are incorporated herein by reference.

BACKGROUND OF THE INVENTION

1. Field of the Invention

This invention generally relates to system-on-chip (SoC) processor core management and, more particularly, to a system and method processor core and supporting hardware dedicated to low power standby mode operations.

2. Description of the Related Art

There are a number of mid to high-end electronic systems such as multifunction enterprise and home printers, enterprise and home routers/gateways, and enterprise and home wireless access points, etc. These systems have become necessary for residential and business applications. Conventionally, these devices are switched-on and networked with other devices at all times, even if they not performing data path processing. In fact, actual data path processing is typically very low. As an example, a small business printer is unlikely to print documents throughout the day, and almost never performs any tasks in the night. Keeping these device switched on at all the times is a waste of power. However, if they are switched off, the devices are not able to reply to system and network control messages, or perform housekeeping activities.

Conventionally, the solution to this problem is to put the systems into a power-save mode. However, this solution has the following deficiencies. When the system is in power-down or power-save mode, the system is unable to respond to network prompted or internal tasks. The only event it responds to is a command putting the system back in full power-up mode. Thus, to reply to a simple network control message, all the system resources are brought back to working in the full-power mode, including resources that are not used for the reply. After returning to the full-power mode, the system becomes fully functional and wastes power while not performing any significant tasks.

The system goes back into power-down mode again only after waiting for a while for inactivity or any other defined algorithm. When the system is in power-down mode, it can't perform any functions, and thus, is not able to perform any housekeeping activities, which are generally done on timer events. Again, the system has to fully wake up and be put in full-power mode to service the timer event for housekeeping activities, which again wastes power unnecessarily.

It would be advantageous if a SoC was able to perform low level tasks without operating in a full power mode.

SUMMARY OF THE INVENTION

Described herein is a system-on-chip (SoC) capable of running software applications, which are not time and latency sensitive, in low-power mode, thus saving significant power usage by the system. The SoC solves all the above-mentioned problems and improves system power usage significantly while also replying to control messages, originating control messages, and also performing housekeeping activities on timer events. Thus, the SoC minimizes system power dissipation while maintaining a minimal system functionality—performing background jobs, replying to control messages, and originating control messages as well.

Accordingly, a method is provided for using a low-power processor to manage power-save mode operations in an SoC. The SoC has a high-speed group including at least one high-speed processor, a standby agent, and a governor. In one aspect, the standby agent includes a low-power processor, with internal random access memory (RAM), operating at a lower speed than the high-speed processor, a low-power power supply, a low power bus, a memory controller, and a low power IO interface. In response to inactivity or some other control algorithm, the governor establishes a power-save mode and deactivates the high-speed group, but not the standby agent. The standby agent monitors SoC input/output (IO) interfaces, and determines the speed requirements associated with a received communication. In response to determining that the communication does not prompt a high-speed SoC operation, the standby agent responds to the communication. Likewise, the standby agent monitors SoC internal events such as housekeeping and timer activity and performs the tasks if it is determined that the tasks do not require a high-speed SoC operation.

Alternatively, in response to determining that a monitored communication or internal event prompts a high-speed SoC operation, the standby agent notifies the governor. Then, the governor activates a member of the high-speed group to respond to the communication.

Additional details of the above-described method, and an SoC with a system using a low power processor to manage power-save mode operations, are provided below.

BRIEF DESCRIPTION OF THE DRAWINGS

FIG. 3 is a flowchart illustrating a method for using a low power processor to manage power-save mode operations in an SoC.

DETAILED DESCRIPTION

As used in this application, the terms "component," "module," "system," and the like may be intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The SoC devices described below typically employ a computer system with a bus or other communication mechanism for communicating information, and a processor coupled to the bus for processing information. The computer system may also includes a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with position calculation. Alternately, these functions, or some of these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Figure 1:
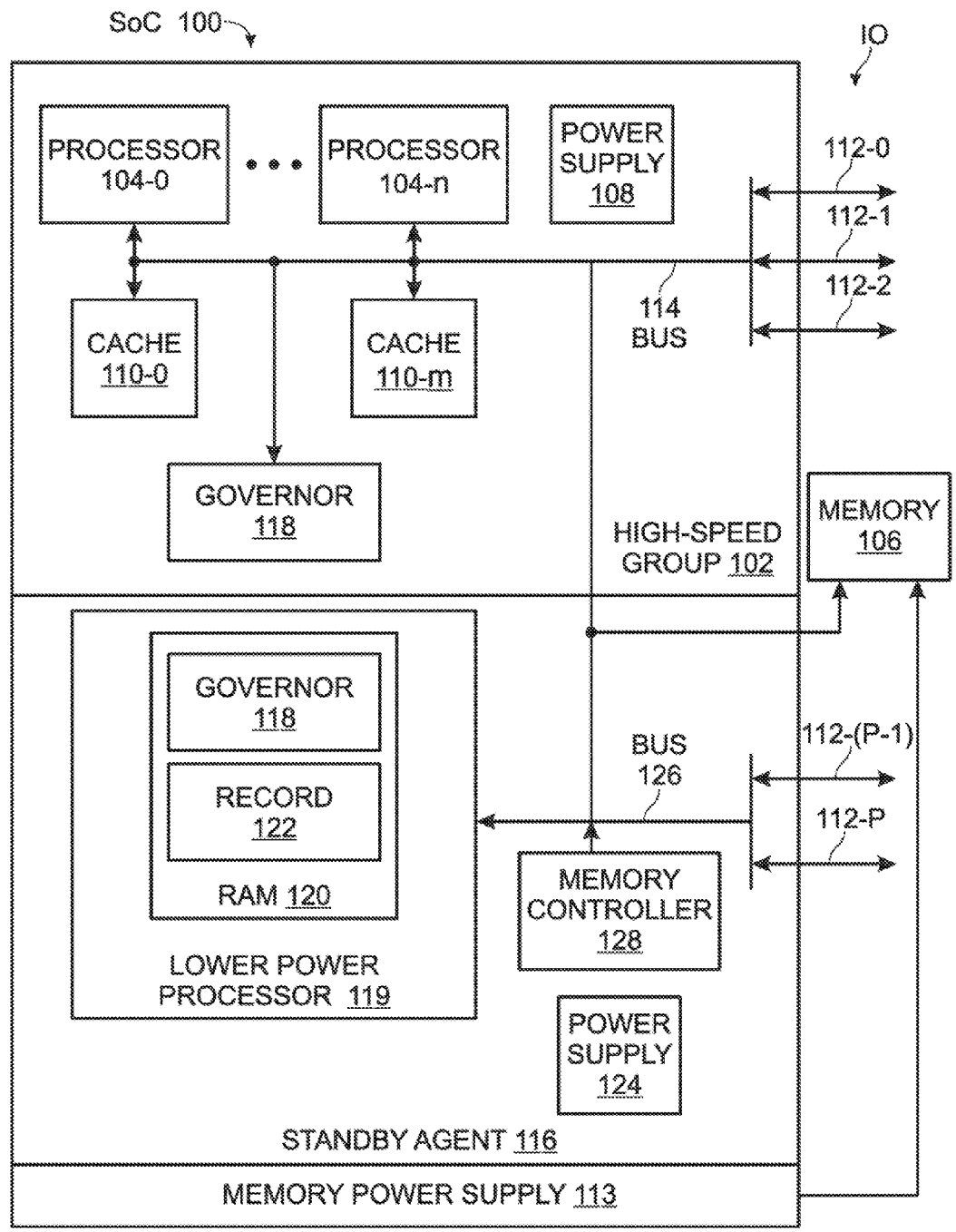
FIG. 1 is a schematic block diagram of a system-on-chip (SoC) with a system for using a low power processor to manage power-save mode operations.

FIG. 1 is a schematic block diagram of a system-on-chip (SoC) with a system for using a low power processor to manage power-save mode operations. The SoC 100 comprises a high-speed group 102 including at least one high-speed processor 104. Shown are processors 104-0 through 104-n, where n is an integer variable not limited to any particular value. The high-speed group may also include at least one high-speed power supply 108, one high-speed cache 110, one high-speed IO interface 112, and one high-speed bus 114, all operating in cooperation with the high-speed processor(s) 104. Shown are m caches 110 and p IO interfaces 112, where m and p are integer variable not limited to any particular value. Typically, the SoC is associated with an off-SoC memory 106 (e.g., dual in-line memory module (DIMM)). Also shown is an on-SoC memory power supply 115 that supplies power to the off-SoC memory 106

A standby agent 116 monitors the IO interfaces 112 and determines the speed requirements associated with a received communication. A governor 118, typically enabled as a sequence of software instructions stored in memory and executed by a processor, establishes a power-save mode and deactivates the high-speed group 102, but not the standby agent 116. When the governor 118 deactivates the high-speed group, the high-speed processor(s) 104, the high-speed power supply 108, the high-speed cache 110, the high-speed IO interface(s) 112, and the high-speed bus 114 are deactivated.

Further, the governor may place the memory 106 in a self-refresh mode, and scale the memory power supply 115 back accordingly. In response to determining that the communication does not prompt a high-speed SoC operation, the standby agent 116 responds to the communication. Some examples of communications that do not prompt high-speed SoC operations include latency insensitive, ping, advertise broadcast, and Ethernet messages. Other examples include response to address resolution protocol (ARP) packets, responses to Internet control message protocol (ICMP) packets, process certain control packets like Internet group management protocol/border gateway protocol (IGMP/BGP) and update routing tables, and responses to name queries for domain names.

The standby agent 116 may include a low power (low-speed) processor 119, with internal random access memory (RAM) 120, operating at a lower speed than the high-speed processor 104, a low-power power supply 124, a low power bus 126, a memory controller 128 (e.g., a DDR controller), and a low power IO interface 112, all operating in conjunction with the low power processor 119.

The standby agent 116 notifies the governor in response to determining that the communication via an IO interface 112 prompts a high-speed SoC operation. The governor 118 activates a member of the high-speed group, the off-SoC memory 106, or both, to respond to the communication. That is, the governor 118 and standby agent 116 may be understood as operating in cooperation to monitor communications and notify. Otherwise, the standby agent may comprise a software component, embedded in memory (e.g., RAM 120) to support monitoring and notification operations. Typically, a portion of the governor 118 is embedded in the high speed group to enable power down operations, and a portion of the governor is embedded with the standby agent (e.g., in RAM 120) to power up the high-speed group when necessary and perform latency insensitive functions.

In one aspect, the standby agent 116 determines that a communication received via IO interface 112, or an SoC internal event, prompts an SoC operation requiring a temporary high-speed assist, and sends a temporary assist message to the governor 118. The governor 118 activates a member of the high-speed group 102, off-SoC memory 106, or both to assist in performing the SoC operation, and subsequent to the performance of the SoC operation, the governor deactivates the selected components. Note: if the memory is temporarily activated, the memory controller 128 in the standby group can be used, while scaling up the memory power supply 115 as needed.

Alternatively, the standby agent 116 may monitor SoC internal events such as housekeeping and timer activity, and determine speed requirements associated with tasks prompted by the internal events. The standby agent 116 performs the tasks in response to determining that the tasks do not require a high-speed SoC operation. Reference to system timers are made to broadcast keep alive messages on network, originating from the SoC 100. Housekeeping activities include updating statistics, checking temperature, activating/deactivating fan controls, switching on/off board devices through an I2C interface, which is also in low power domain or standby agent.

In one aspect, the standby agent 116 monitors an initial packet in a series of packets requiring a high power SoC operation, and waits to monitor a subsequent packet in the series before sending the temporary assist message. The governor 118 activates a high-speed group 102 member, off-SoC memory, or both to assist in processing both the initial and subsequent packets. That is, the subsequent packet is processed, without deactivating the high-speed group member, after processing the initial packet.

In another aspect, the standby agent 116 makes a record 122 of communications activity and internally prompted tasks requiring a high power SoC operation, cross-referenced to an indicator such as time or a causal event. For example, the record 122 can be maintained in RAM 120. The standby agent 116 analyzes the record 122, determines when or if high-speed SoC operations are likely to occur, and sends the temporary assist message to the governor in response to the determination.

As used herein, the term "core" refers to an integrated circuit die of connected hardware sub-components that supply electrical signals in response to electrical signal stimuli. While these electrical signals may be indirectly affected by software operations performed external to die, there is no processor or software application internal to the die generating electrical signals. Any logic functions performed internal to the core are the result of a hardware based state machine type logic.

Functional Description

Figure 2:
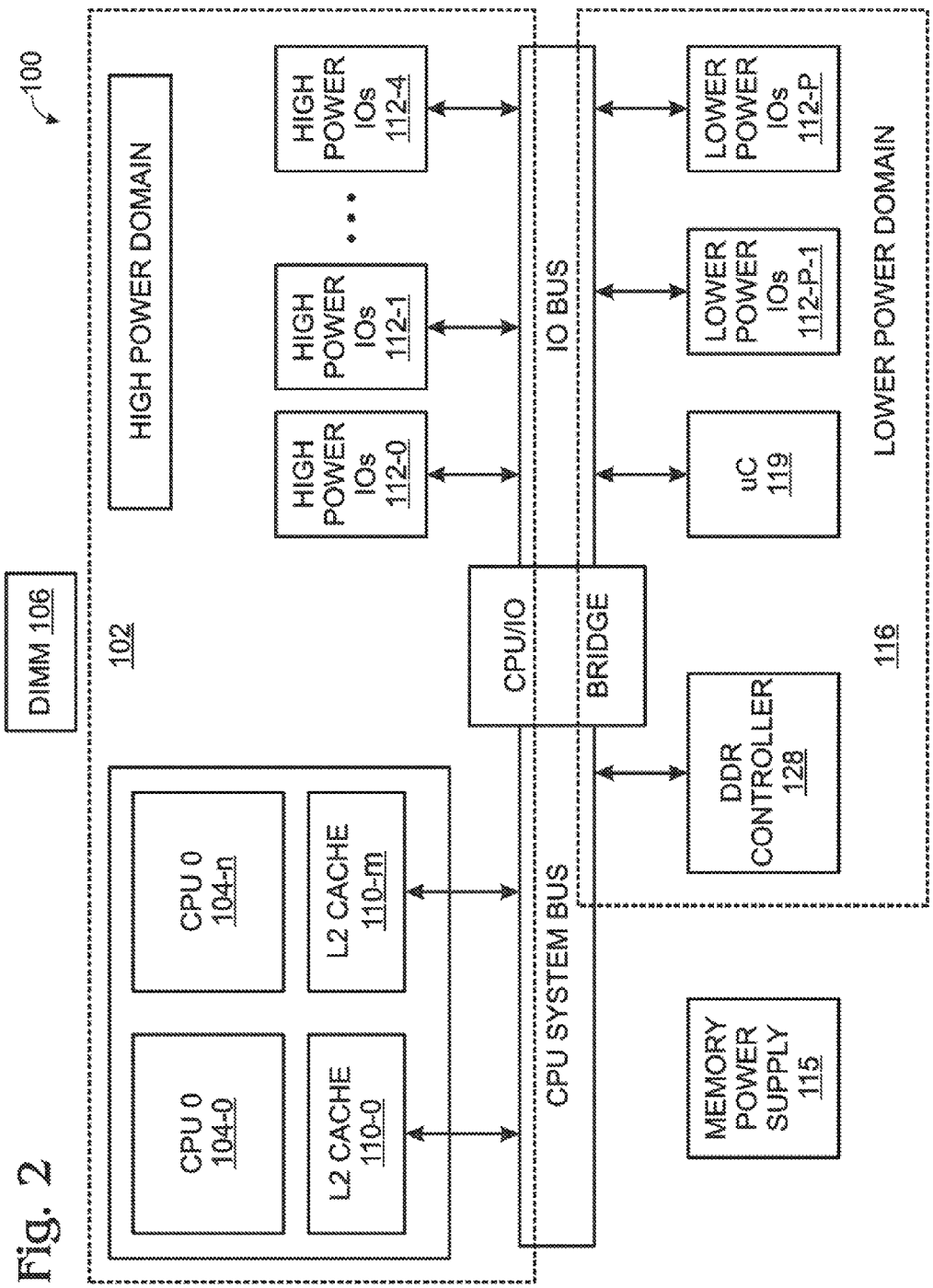
FIG. 2 is a schematic block diagram illustrating the SoC of FIG. 1 from a different perspective.

FIG. 2 is a schematic block diagram illustrating the SoC of FIG. 1 from a different perspective. The SoC is designed to have different internal power islands, enabling different power sources for different components of the SoC. The SoC may contain a main central processing unit (CPU), L2 data cache, DDR memory controller, high-speed bus fabric, high-speed IO devices, low-power bus fabric, medium-speed bus fabric, medium-speed IO devices, low-speed bus fabric, and low-speed IO devices, etc. In one variation, the SoC may include a low-speed and very low-power CPU, which is an intelligent agent residing on the low-power bus, able to communicate with the entire system. The different power islands of the SoC result in separate power supplies for two different sets of devices. There is one power supply for main CPU, L2 caches, high speed IO bus, high speed peripherals, and other power supply for low speed, low power intelligent CPU, DDR controller, and energy efficient IOs, such as an energy efficient Ethernet port which runs in a low power mode.

When the system is in full power-up mode, all the power domains are up and receiving power. The system is working normally, and the user is able to perform main data path functions. For example, if the device is printer, then user can print documents. If the device is wireless access point, the user can connect to the Internet and transfer data.

However, if the device is not being used, there are power manager governors which use algorithms to determine device inactivity. If one of the algorithms determines that the device is inactive, then the governor puts the SoC in the power-down mode. In the case of a network-attached multifunctional printer, if no jobs have been printed for quite some time, there is no need for it to be fully active and dissipating significant amounts of power. The device can be put into a power saving, 'deep sleep', or low-power mode.

However, even in low-power mode, an intelligent CPU agent is kept alive. Thus, power is cut to the main CPU, L2 caches, high-speed IO devices, high-speed buses, etc., which significantly reduces power consumption. A minimum of power enables the low power domain components, including an intelligent CPU agent, which is a low-power microcontroller, DDR memory controller, and energy efficient IOs, such as Ethernet IOs. Since the data in memory needs to be preserved, the DDR is put in self refresh mode. In this mode the memory is self refreshing and no data is lost. However, the DDR cannot be accessed. Also, even though some power is supplied to DDR controller, cutting off the clocks to DDR memory controller saves power.

With the very low-power CPU, and some energy efficient IOs also running, it is possible for the low-power CPU to reply to control packets received via Ethernet port. Generally, the low-power microcontroller running in low power mode has its own internal memory. To save the power and reduce system cost, the internal memory is generally very small and can't run large applications, respond to every network administration command, or perform the housekeeping job for the entire system. However, it is able to reply to small control messages like a ping command. When the system is in power-down mode, it appears to network that the SoC is alive.

As mentioned above, when the DDR (system memory) is powered down, it is in a self refresh mode and preserving contents. While the on-chip DDR controller is in the clock gate mode, it is not possible to access the DDR. To run large applications, access the DDR is needed. The low-power processor (standby agent) looks at the commands received from network and determines if a response requires the use of a large application, not running in internal RAM, but rather, with instructions and data residing in DDR memory. When this condition is detected, the DDR controller is temporarily taken out of clock gate, and the clock is supplied to it. The memory is also taken out of self refresh and made functional. The location of the instructions in the DDR, needed for packet processing or application running, are known and jumped to, and execution occurs. As it is run to completion processing, the work is finished, the DDR is retuned to self refresh mode, and the clock gates the DDR controller.

The standby agent can determine that, if it receives a packet P1, then it will also receive the following packet P2. In this case, instead of taking the DDR out of self refresh and jumping to packet processing immediately, the governor waits for packet P2 to arrive. Then, it takes DDR out of self refresh only once, and hands over both packets P1 and P2 to an application at the same time. Thus, jitter and delays in application processing are handled in a smooth way.

The governor can also determine that when it receives a certain first task to perform, that related tasks are likely to follow. Instead of immediately jumping on the first task, it can wait an amount of time before starting. In this waiting time, the related tasks are received and they can be logically arranged in a task queue. As all these tasks may require access to the DDR, the entire queue of tasks can be efficiently processed in one shot, rather than swinging between DDR on and off modes. Minimizing on/off power swings is more power efficient and reduces power glitches.

The low-power processing core (standby agent) can also look at the patterns of tasks and packets it receives, and based on that, set the waiting time, task queue size, and decide power on wait policies. The Pattern analysis can be based upon a history of activity. For example, certain type of commands come in night time, certain type of commands come in day time at a particular time. It looks at all the history and then predicts the activity. Based on expected activity, task execution policies can be implemented.

FIG. 3 is a flowchart illustrating a method for using a low power processor to manage power-save mode operations in an SoC. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 300.

Step 302 provides an SoC with a high-speed group including at least one high-speed processor, a standby agent, and a governor enabled as a sequence of software instructions stored in memory and executed by a processor. In Step 304 the governor establishes a power-save mode and deactivates the high-speed group, but not the standby agent. In Step 306 the standby agent monitors SoC IO interfaces. In Step 308 the standby agent determines the speed requirements associated with a received communication. In response to determining that the communication does not prompt a high-speed SoC operation, the standby agent responds to the communication in Step 310. For example, the communication may be a ping, advertise broadcast message, Ethernet, or other latency insensitive message.

Alternatively, in Step 312 the standby agent notifies the governor in response to determining that the communication prompts a high-speed SoC operation. In Step 314 the governor activates a member of the high-speed group, to respond to the communication.

In one aspect, Step 302 provides an SoC high-speed group additionally including at least one high-speed power supply, one high-speed cache, one high-speed IO interface, and one high-speed bus operating in cooperation with the high-speed processor. Step 302 also provides a standby agent with low-power (low-speed) processor, with internal RAM, operating at a lower speed than the high-speed processor core, a low-power power supply, a low-power bus, a memory controller, and a low-power IO interface operating in conjunction with the low power processor. Further, Step 302 provides an on-SoC memory power supply for an off-SoC memory. Deactivating the high-speed group in Step 304 includes deactivating the high-speed processor, the high-speed power supply, the high-speed cache, the high-speed IO interface, and the high-speed bus. Further, the off-SoC memory is placed in a self-refresh mode and the memory power supply scaled backed accordingly.

In one aspect, determining the speed requirements associated with the communication in Step 308 includes the standby agent determining that the communication prompts an SoC operation requiring a temporary high-speed assist. Then, in Step 316 the standby agent sends a temporary assist message to the governor. In Step 318 the governor activates a member of the high-speed group, the off-SoC memory, or both to assist in performing the SoC operation. Subsequent to the performance of the SoC operation, the governor deactivates the selected components (high-speed group member and/or off-SoC memory) in Step 320.

In one aspect, monitoring the SoC IO interfaces in Step 306 includes the standby agent monitoring an initial packet in a series of packets requiring a high power SoC operation. Then, sending the temporary assist message to the governor in Step 316 includes the standby agent waiting to monitor a subsequent packet in the series before sending the temporary assist message. In Step 318 the governor activates the high-speed group member, off-SoC memory, or both to assist in processing both the initial and subsequent packets, without interposing deactivation operations.

In another aspect, monitoring the SoC IO interfaces in Step 306 includes the standby agent making a record of communications activity and internally prompted tasks, cross-referenced to an indicator such as time (e.g., time of day or day of the week) or causal events, requiring a high power SoC operation. Then, sending the temporary assist message to the governor in Step 316 includes the standby agent analyzing the record, determining when the high-speed SoC operations are likely to occur, and sending the temporary assist message in response to the determination.

In one aspect, Step 306 includes the standby agent monitoring SoC internal events such as housekeeping and timer activity, and Step 308 determines speed requirements associated with tasks prompted by the internal events. If the tasks do not require a high-speed SoC operation, the standby agent performs the tasks in Step 310. Alternatively, if the standby agent determines that the tasks require a high-speed SoC operation (Step 308), the governor is notified in Step 312, and the governor activates a member of the high-speed group, off-SoC memory, or both to perform the task in Step 314.

A system and method have been provided for using a low power processor to manage power-save mode operations in a SoC. Examples of particular message structures, processors, and hardware units have been presented to illustrate the invention. However, the invention is not limited to merely these examples. Other variations and embodiments of the invention will occur to those skilled in the art.

We claim:

1. A method for managing power utilization on a system-on-chip (SoC) comprising:
   establishing a high-speed processor on the SoC in a power-save mode in response to sensing inactivity on the SoC;
   monitoring a communication to the SoC for a processor requirement while the high-speed processor is maintained in the power-save mode;
   generating a determination of whether to process the communication with a low-speed processor that is on the SoC or the high-speed processor based on the processor requirement for the communication; and
   processing the communication with the high-speed processor in response to the determination by communicating a temporary assist message to a governor that temporarily activates the high-speed processor from the power-save mode for the processing and re-establishes the high-speed processor in the power-save mode.

2. The method of claim 1, further comprising:
   monitoring an initial packet and a subsequent packet in a plurality of packets of the communication to the SoC before communicating the temporary assist message.

3. The method of claim 1, further comprising:
   supplying power from an on-SoC memory power supply to an off-SoC memory;
   wherein establishing the high-speed processor in the power-save mode comprises
   scaling back the on-SoC memory power supply and placing the off-SoC memory in a self-refresh mode.

4. The method of claim 1, wherein the establishing the high-speed processor on the SoC in the power-save mode comprises deactivating the high-speed processor, a high speed power supply, a high speed cache, a high-speed input/output interface and a high speed bus that are communicatively coupled to one another on the SoC.

5. The method of claim 1, wherein monitoring the processor requirement comprises the standby agent determining a speed requirement associated with the communication and the determining comprises determining that the communication prompts an SoC operation via the high-speed processor based on the speed requirement.

6. The method of claim 1, further comprising temporarily activating an off-SoC memory in response to the temporary assist message and scaling back an on-SoC memory power supply that supplies power to the off-SoC memory and placing the off-SoC memory in a self-refresh mode.

7. The method of claim 1, further comprising making a record of communications activity and internally prompted tasks, cross-referenced to an indicator selected from at least one of time and causal events, requiring a high power SoC operation; and, wherein communicating the temporary assist message includes analyzing the record, determining when the high-speed SoC operation is likely to occur, and sending the temporary assist message in response to the determination of when the high-speed SoC operation is likely to occur.

8. The method of claim 1, wherein the monitoring the processor requirement comprises:
monitoring an SoC internal events comprising at least one of housekeeping activity or a timer activity;
determining a speed requirement associated with a task prompted by the internal event.

9. The method of claim 1, further comprising:
processing the communication via the low-speed processor in response to the determination and while the high-speed processor is maintained in the power-save mode.

10. A system-on-chip (SoC) comprising:
a high-power processor configured to process a high-power communication;
a low-power processor configured to process a low-power communication; and
a governor configured to:
place the high-powered processor in a stand-by mode in response to sensing inactivity on the SoC; and
process the high-power communication to the high-power processor by temporarily activating the high-power processor from the stand-by mode and returning the high-power processor to the stand-by mode, in response to receiving a temporary assist message from the low-power processor.

11. The SoC of claim 10, wherein the governor is further configured to place the high-powered processor in the stand-by mode by deactivating the high-powered processor and at least one of a high-speed power supply, a high-speed cache, a high-speed IO interface, or a high-speed bus, on the SoC.

12. The SoC of claim 10, further comprising:
an on-SoC memory power supply configured to supply power for an off-SoC memory;
wherein the governor is further configured to place the off-SoC memory in a self-refresh mode and scale back the on-SoC memory power supply.

13. The SoC of claim 10, further comprising:
a standby agent configured to generate a determination of whether a communication is the high-power communication or the low-power communication.

14. The SoC of claim 13, wherein the standby agent is further configured to determine that the communication prompts an SoC operation that includes a temporary high-speed assist, and communicate a temporary assist message to the governor; and
the governor is further configured to activate at least one of the high-powered processor, a high-speed power supply, a high-speed cache, a high-speed IO interface, or a high-speed bus, on the SoC, and an off-SoC memory, to assist in performing the SoC operation, and subsequent to the SoC operation, deactivates the at least one of the high-powered processor, the high-speed power supply, the high-speed cache, the high-speed IO interface, or the high-speed bus, on the SoC, and the off-SoC memory.

15. The SoC of claim 13, wherein the standby agent is further configured to monitor an initial packet in a series of packets of the communication and wait to monitor a subsequent packet in the series before sending a temporary assist message to the governor based on the determination.

16. The SoC of claim 14, wherein the standby agent is further configured to generate a record of communications activity and internally prompted tasks, cross-referenced to an indicator selected from at least one of time and causal events of a high power SoC operation, analyze the record, determine when high-speed SoC operations are likely to occur, and communicate a temporary assist message in response to the determination of when the high-speed SoC operations are likely to occur.

17. The SoC of claim 13, wherein the standby agent monitors an SoC internal event from at least one of a housekeeping activity and timer activity, and determine a speed requirement associated with a task prompted by the internal event, and perform the task in response to determining that the task comprises a high-speed SoC operation.

18. The SoC of claim 10, further comprising:
a standby agent comprising the low-power processor configured to operate at a lower speed than the high-power processor, a low-power power supply, a low power bus, a memory controller, and a low power interface operating, and configured to process the low-power communication while the high-power processor is in the stand-by mode based on a determination that the communication is the low-power communication.

19. In a system-on-chip (SoC), a method for using a low power processor to manage power-save mode operations, the method comprising:
operating an SoC comprising at least one high-speed processor, a standby agent that includes a low-speed processor, and a governor;
establishing a power-save mode and deactivating the at least one high-speed processor;
monitoring a communication received by the SoC via the standby agent;
determining a speed requirement associated with a the communication;
in response to determining that processing the communication comprises a low-speed SoC operation, processing the communication via the standby agent, and
in response to determining that processing of the communication comprises a high-speed SoC operation, communicating a temporary assist message to the governor via the standby agent and temporarily activating the at least one high-speed processor from the power-save mode for the processing and re-establishing the at least one high-speed processor in the power-save mode.

20. The method of claim 19, further comprising:
communicating the temporary assist message to the governor based on a record of when the high-speed SoC operation is likely to occur.

* * * * *